Figure 1:
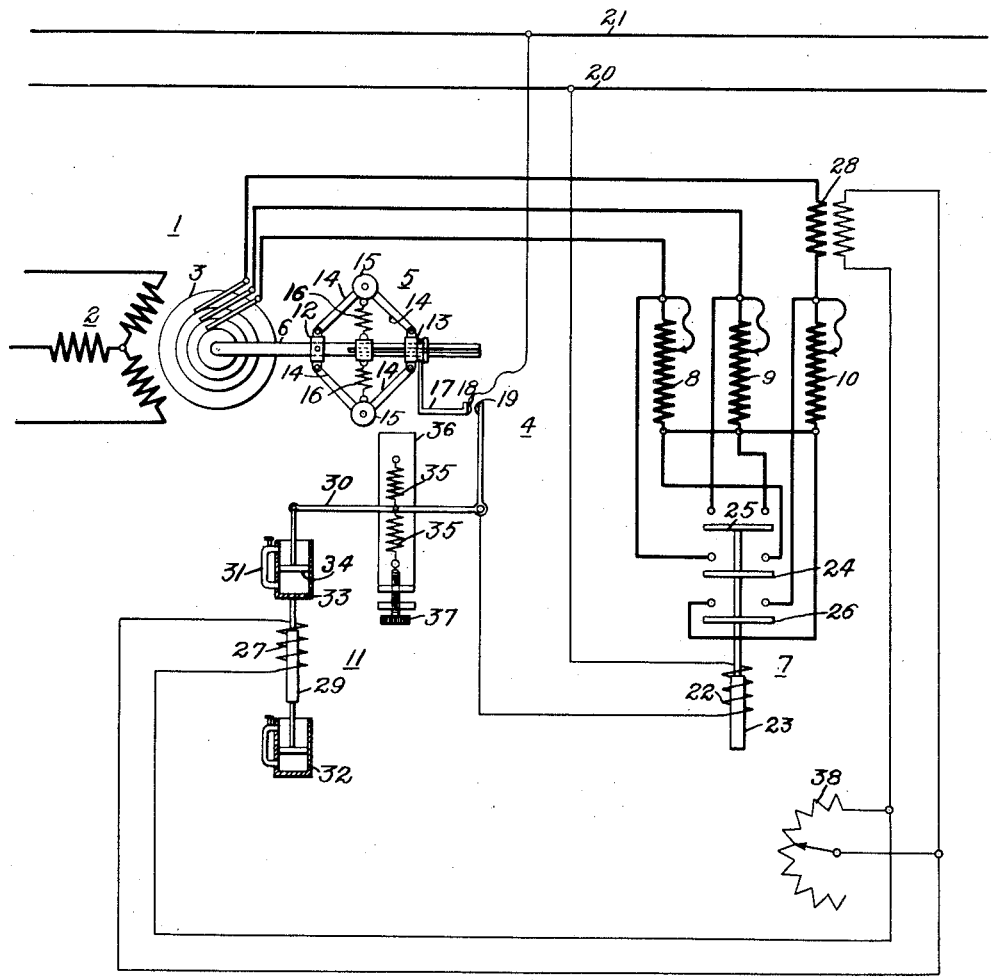

S. A. STAEGE.
SPEED REGULATOR SYSTEM.
APPLICATION FILED APR. 9, 1919.

1,438,616.  Patented Dec. 12, 1922.

WITNESSES:
J. A. Helsel.
W. B. Wells.

INVENTOR
Stephen A. Staege.
BY
Wesley G. Carr
ATTORNEY

Patented Dec. 12, 1922.

1,438,616

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed April 9, 1919. Serial No. 288,711.

*To all whom it may concern:*

Be it known that I, STEPHEN A. STAEGE, a citizen of the United States, and a resident of Pittsburgh, in the county of Allegheny and State of Pennsylvania, have invented a new and useful Improvement in Speed-Regulator Systems, of which the following is a specification.

My invention relates to speed-regulator systems and particularly to regulator systems for governing the speed of electric motors.

One object of my invention is to provide a regulator system of the above-indicated character that shall, in a simple and economical manner, maintain the speed of a motor substantially constant and be substantially free from any so-called hunting action.

In the operation of many machines, it is essential to maintain the propelling motors for such machines much closer to a constant speed than can be effected by the inherent qualities of the motors. In case a shunt-wound motor is utilized for propelling the machines, the speed is maintained fairly constant by the inherent qualities of the motor, if the load on the motors is held within certain predetermined limits, but, beyond such limits, some auxiliary means must be provided for maintaining the speed of the motor substantially constant.

Inasmuch as the speed of an induction motor varies in accordance with its load, it is essential, at all times, to provide auxiliary means for governing the speed of the motor if it is desired to operate it at a substantially constant speed.

The speed of an induction motor may be controlled by varying the value of resistors included in the circuit of the rotor winding, and the speed of a shunt-wound motor may be controlled by varying the value of a resistor included in the circuit of the shunt field winding. In case the above-mentioned resistors are controlled directly in accordance with the motor speed, it will be noted that the motor regulator will affect a constant hunting action, if it is at all sensitive to speed changes, unless special or auxiliary means is provided for preventing over-travel of the regulating means.

In a regulator system constructed in accordance with my invention for governing the speed of a dynamo-electric machine, a fly-ball governor, which is mounted on the armature of the machine, is operated in accordance with the machine speed. The fly-ball governor is adapted to open and close the energizing circuit of a switch which controls either the resistors included in the rotor circuit of the induction motor or the resistor included in the field-winding circuit of the shunt-wound motor, as the case may be. Such means alone, as above set forth, would be unsatisfactory for governing the speed of the machine, inasmuch as it would be subject to a constant hunting action and in no way would be stable in operation. Accordingly, auxiliary means is provided for controlling the circuit of the resistor switch, independent of the fly-ball governor, in order to prevent over-travel of the apparatus. Preferably, an electromagnetic device is controlled directly in accordance with current flowing through the armature of the machine for opposing the action of the fly-ball governor and for opening or closing the energizing circuit of the resistor switch, according to whether the speed of the machine is being raised or lowered to normal value, just previous to the obtaining of normal operating speed. Thus, the apparatus is prevented from over-traveling and, if the regulator is properly adjusted, the inertia of the moving parts will bring the machine to normal operating speed.

Figure 2:
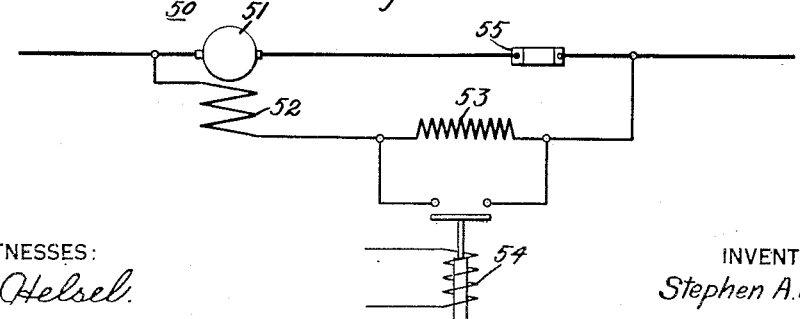

In the accompanying drawing, Fig. 1 is a diagrammatic view of a regulator system constructed in accordance with my invention, and Fig. 2 is a diagrammatic view of a modification of my invention.

Referring to Fig. 1 of the drawing, an induction motor 1, comprising a stator 2 and a rotor 3, is adapted to be operated at a substantially constant speed by means of a regulator 4.

The regulator 4 embodies a fly-ball governor 5 which is mounted on the armature shaft 6, an electrically operated switch 7 which serves to short-circuit rotor resistors 8, 9 and 10, under conditions to be described later, and an electro-magnetic device 11 which serves to prevent a hunting action by the regulator.

The fly-ball governor 5 comprises a collar 12 which is rigidly mounted upon the shaft 6, a collar 13 which is slidably mounted thereon, and pivotally connected links and weights 14 and 15 which serve to connect the two collars. Two springs 16 are connected to the weights 15, in any suitable manner, to normally bias the slidable collar 13 away from the rigidly mounted collar 12. A contact arm 17, having a contact member 18 mounted thereon, is connected to the slidable collar 13 in any suitable manner.

The contact member 18 is adapted to engage a second contact member 19 for completing a circuit from supply conductors 20 and 21 through the energizing winding 22 of the switch 7. The energizing winding 22 operates on a core armature 23 which is connected to the switch members 24, 25 and 26. The switch members 24, 25 and 26 respectively short-circuit the rotor resistors 8, 9 and 10 when the switch 7 is in an operative position.

The electromagnetic device 11 embodies an energizing winding 27 which is connected to the rotor circuit by means of a transformer 28 in order to be operated in accordance with the rotor current. A floating core armature 29 is controlled by the winding 27, and a pivotally mounted arm 30 is connected to the core armature 29 by a loose-link connection 31. The contact member 19, which is engaged by the contact member 18 for completing a circuit through the coil 22, is mounted on one end of the contact arm 30. The action of the core armature 29 is dampened by means of a dash-pot 32 which is provided with a by-pass between the upper and lower portions thereof in order that the operation of the armature may be regulated to any desired sensitiveness.

The loose-link connection 31 between the core armature 29 and the contact arm 30 embodies a receptacle 33 directly mounted on the core armature and containing some fluid, preferably oil, and a plunger 34 pivotally connected to the contact arm 30 and operating within the receptacle 33. A by-pass is provided between the upper and lower portions of the receptacle 33 for adjusting the connection to any desired degree of sensitiveness. The contact arm 30 is biased to a normal position by means of two springs 35, each of which has one end connected to a movable support 36 and the other end connected to the contact arm 30. The movable support 36 is adjusted to any desired position by some suitable means such, for example, as the screw 37. An adjustable resistor 38 is provided for governing the energization of the winding 27.

In case an excessive load is placed upon the motor 1 and the speed thereof is reduced below normal value, the centrifugal force acting upon the weights 15 will be correspondingly reduced. Thereupon, the weights 15 will be drawn toward each other by means of the springs 16, and the collar and contact arm 17 will be moved in a manner to effect engagement between the contact members 18 and 19. Upon engagement of the contact members 18 and 19, a circuit is completed from the supply conductors 20 and 21 through the winding 22 of the electrically-operated switch 7. The switch 7 effects the short-circuiting of the rotor resistors 8, 9 and 10 for increasing the speed of the motor 1.

If the system were unprovided with any anti-hunting means, the motor speed would be increased until the fly-ball governor 5 effected the separation of the contact members 18 and 19 to again insert the resistors 8, 9 and 10 in circuit with the rotor 3. However, such operation is objectionable, inasmuch as the over-travel of the various moving parts of the system would increase the speed of the motor somewhat above normal value. In order to prevent any hunting action, the electromagnetic device 11 is provided which is operated directly in accordance with the current obtaining in the circuit of the rotor 3. Thus, when the speed of the motors is raised to a predetermined value, the energizing coil 27 is operated by a circuit including the transformer 28 to move the pivotally-mounted contact arm 30. The contact arm 30 effects the separation of the contact members 18 and 19 before the motor has been raised to normal speed and at such time that the inertia of the moving parts of the regulator will bring the motor substantially to normal speed. The position of the contact member 19, relative to the contact member 18, may be adjusted by means of the thumb-screw 37 which controls the position of the support 36 and the two springs 35. It will also be noted that the regulator may be compensated for the time lag and inertia of the various parts of the system by means of the by-passes for the dash-pots 33 and 32 and the adjustable resistor 38 to effectively prevent over-travel.

The above operation of the fly-ball governor 5 is intermittently effected in accordance with the speed of the motor to complete the energizing circuit of the winding 22 and thus maintain the speed of the motor substantially constant.

When the motor 1 is operating under a heavy load, it is desirable to have the resistors 8, 9 and 10 shunted a greater portion of the time whereas, when the motor is operating under a light load, it is preferable to have the resistors included in the rotor circuit a greater portion of the time. In the anti-hunting means above-described, such operation is automatically effected by the position of the core armature 29 relative to the winding 27. Thus when the motor is operating under a heavy load, the winding 27 is energized to a greater extent, and the core 29 assumes a position more nearly central with the winding. Accordingly, the impulses transmitted to the winding 27 have a weaker effect on the core armature 29 than if the winding were not so strongly energized.

In case the motor is operating under a light load, the core armature 29 assumes a lower position relative to the winding 27 and, accordingly, the impulses transmitted to the winding from the transformer 28 have a greater effect on the core armature 29 than when the winding was more strongly energized.

In brief, it may be noted that the position of the core armature 29, relative to the winding 27, has more effect on the opening and closing of the contact members 18 and 19 than the strength of the current which is supplied to the winding 27.

The electromagnetic device 11 not only serves to prevent a hunting action by the complete regulator 4 but also serves as a regulator for governing the speed of the motor 1, within certain limits. The fly-ball governor 5 is only operated by a substantial change in the speed of the motor 1 and, inasmuch as it is desired to maintain the motor at a substantially constant speed, the electromagnetic device corrects the motor for any small variations in speed.

The main contact member 19 is vibrated, relative to the contact member 18, at varying rates in accordance with the current flowing through the rotor winding and effects the shunting of the resistors 8, 9 and 10 in a manner very similar to the operation of a regulator of the well-known Tirrill type. The operation of the electro-magnetic device 11 for controlling the speed of the motor 1 is similar to its operation for preventing a hunting action by the regulator 4 and, accordingly, a detailed description of its operation is deemed unnecessary.

In the modification illustrated in Fig. 2 of the drawing, parts corresponding to those shown in Fig. 1 having been already described, only so much of the system as differs from that shown in Fig. 1 is illustrated. In Fig. 2, the shunt-wound motor 50, comprising an armature 51 and a field magnet winding 52, is provided with a resistor 53 in the field-winding circuit. The resistor 53 is adapted to be short-circuited by the switch 54 in a manner similar to the short-circuiting of the resistors 8, 9 and 10 by the switch 7 in the system shown in Fig. 1. A current shunt 55 is inserted in the circuit of the armature 51 for governing an anti-hunting device such as that embodied in the system shown in Fig. 1.

In case the shunt motor 50 is operating below normal speed, the switch 54 is operated by a fly-ball governor to short-circuit the resistor 53, in a manner similar to the above-described operation of the system shown in Fig. 1, and an anti-hunting device is supplied with current from the current shunt 55 to effectively prevent any hunting action. Inasmuch as the two systems operate in the same manner, a further description of the operation of the system illustrated in Fig. 2 is deemed unnecessary.

Modifications in the system, and in the arrangement and location of parts may be made within the spirit and scope of my invention and such modifications are intended to be covered by the appended claims.

I claim as my invention.

1. In a speed-regulator system, an alternating-current dynamo-electric machine having a wound rotor, resistors in circuit therewith, means comprising a mechanical governor for governing the speed of said machine by directly controlling said resistors, and means controlled by the electrical conditions of the machine for preventing hunting action by said governor means.

2. In a speed-regulator system, an alternating-current dynamo-electric machine having a wound rotor, resistors in circuit therewith, means comprising a fly-ball governor for governing the speed of said machine and adapted to control said resistors, and means controlled by the armature current for preventing overtravel or hunting action by said governor means.

3. In a speed-regulator system, an alternating-current dynamo-electric machine having a stator and a rotor, resistors in circuit with said rotor, regulator means adapted to control said resistors for maintaining the speed of said machine substantially constant, and means controlled by the current flowing through the rotor of said machine for preventing hunting action by said regulator means.

4. In a speed-regulator system for an alternating-current dynamo-electric machine, a fly-ball governor mounted on the armature of said machine, regulator means controlled by said governor for controlling the speed of the machine comprising a contact arm and means, also comprising a contact arm, controlled by the current flowing through the armature of said machine for governing the operation of said regulator means under predetermined conditions.

5. In a speed-regulator system, an induction motor comprising a stator and a rotor, resistors in circuit with said rotor, means comprising a governor operated by said rotor and adapted to control said resistors for maintaining the speed of said motor substantially constant, and anti-hunting means controlled by the current flowing through the rotor winding for preventing overtravel by said governor means.

6. In a speed-regulator system, an induction motor having a stator and a rotor winding, resistors included in the circuit of said rotor winding, regulator means controlled by the rotor for short-circuiting said resistors to govern the speed of the motor, and anti-hunting means controlled by the current flowing through the rotor winding for influencing the operation of said regulator means.

7. In a speed regulator, the combination with an induction motor comprising a stator and a rotor, and resistors connected in circuit with the winding of said rotor, of a fly-ball governor mounted on said rotor, regulator means controlled by said fly-ball governor for short-circuiting said resistors to control the speed of the motor comprising a contact arm and an electromagnet controlled thereby, and means controlled by the current flowing through the rotor winding for preventing a hunting action by said regulator means.

8. In a speed-regulator system, the combination with an induction motor comprising a stator and a rotor, resistors connected in circuit with the rotor winding of said machine, a switch for short-circuiting said resistors, and a fly-ball governor mounted on said rotor for operating said switch in accordance with the motor speed, of means, comprising an electromagnetic device governed by the rotor current, for preventing the operation of said switch by the governor, under certain conditions.

9. In a speed-regulator system, the combination with an alternating-current dynamo-electric machine having a wound rotor, resistors in circuit with said rotor and an electromagnet for controlling said resistors, of a mechanical governor operated by said rotor, a switch operated by said mechanical governor and adapted to control the circuit to said electromagnet, and anti-hunting means adapted to govern the operation of said switch and comprising an electromagnet energized in accordance with the load current of said dynamo-electric machine.

10. In a speed-regulator system, the combination with an alternating-current dynamo-electric machine having a wound rotor, resistors in circuit with said rotor and an electro-magnet for controlling said resistors, of a mechanical governor operated by said rotor, a contact mechanism controlled by said governor to intermittently energize said electromagnet, and anti-hunting means adapted to control a portion of said contact mechanism and comprising an electromagnet energized in accordance with the load current of said dynamo-electric machine and a loose connection between said contact mechanism and said anti-hunting electromagnet.

In testimony whereof, I have hereunto subscribed my name this 28th day of March 1919.

STEPHEN A. STAEGE.